United States Patent [19]

Corcoran

[11] 3,945,721
[45] Mar. 23, 1976

[54] GROUP DISPLAY SYSTEM
[75] Inventor: Donald G. Corcoran, Montvale, N.J.
[73] Assignee: International Telephone and Telegraph Corporation, Nutley, N.J.
[22] Filed: Nov. 22, 1974
[21] Appl. No.: 526,347

[52] U.S. Cl. .................... 353/84; 353/122; 355/4
[51] Int. Cl.² G03B 21/14; G03B 23/12; G03B 27/17
[58] Field of Search ......... 353/84, 122, 38, 85, 102; 355/4, 5; 354/78, 83; 250/227, 213 VT

[56] References Cited
UNITED STATES PATENTS

| | | | |
|---|---|---|---|
| 3,117,488 | 1/1964 | Giordano | 355/4 |
| 3,400,291 | 9/1968 | Sheldon | 250/227 |
| 3,737,667 | 6/1973 | Babb | 250/227 |

Primary Examiner—Richard E. Aegerter
Assistant Examiner—A. J. Mirabito
Attorney, Agent, or Firm—John T. O'Halloran; Menotti J. Lombardi, Jr.; Richard A. Menelly

[57] ABSTRACT
A group display generator of the type wherein information appearing on the surface of a cathode ray tube is recorded on film and projected in color upon a large viewing screen. The system employs a dry type silver halide film and dry film developing process in cooperation with an image intensifier where the image appearing upon the face of the cathode ray tube is directed to the input of the image intensifier and directed from the output of the intensifier to the surface of the silver halide film in a level of surface brightness intensity equal to or greater than the illumination at the face of the cathode ray tube. The intermittent image intensifier supplies sufficient light intensification to compensate for the low image amplification inherent in the dry type silver halide film. The combination of the image intensifier and dry silver halide film allows compact and mobile group display generator application to areas heretofore inaccessible with prior art wet type film development processes and techniques. The inventive group display generators utilizing combination of optical image intensification and dry film process techniques not only provide direct substitution for wet chemical type group display generators now in existence but also provide group display generator utilization where mobile and compact systems are required.

12 Claims, 5 Drawing Figures

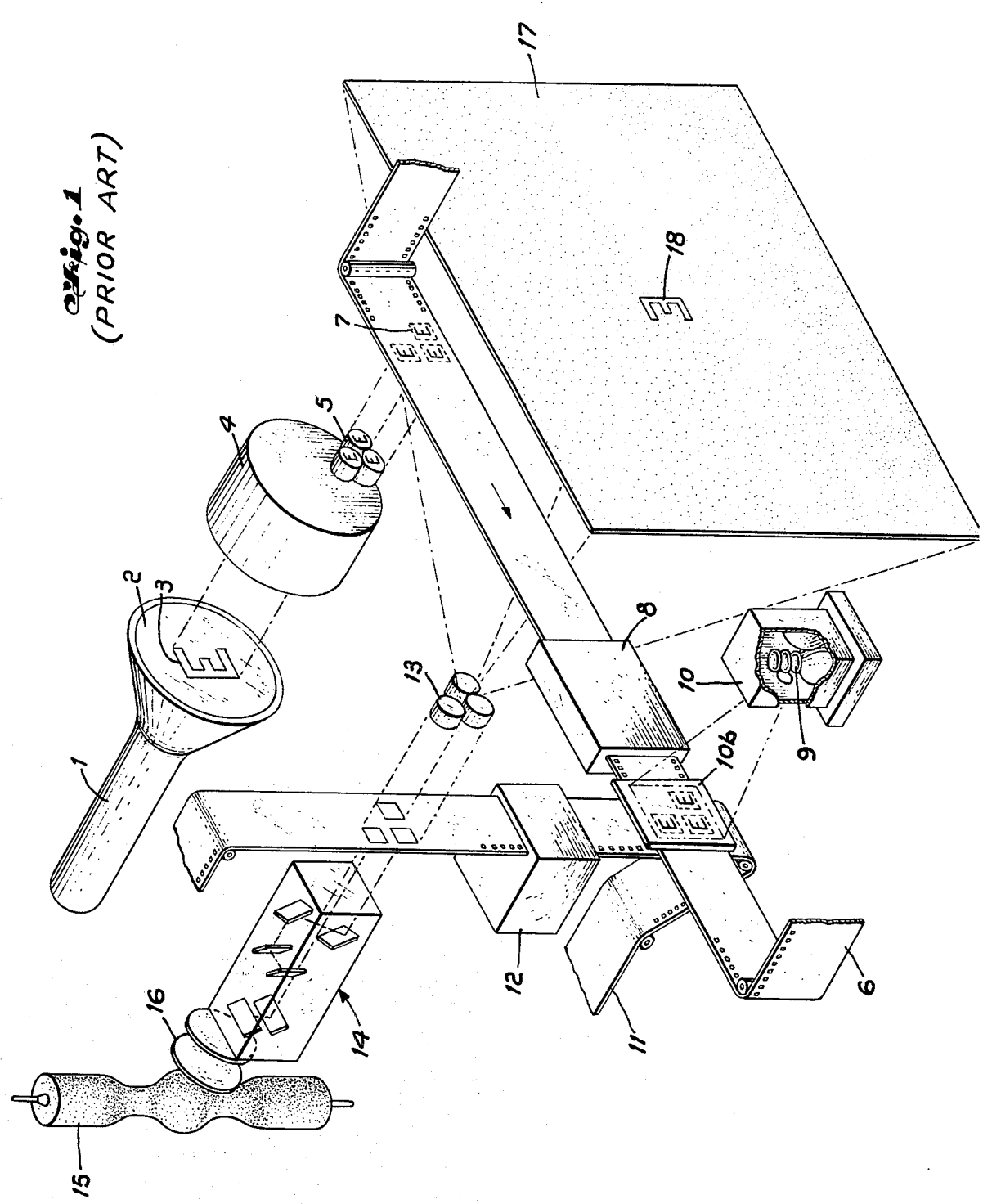

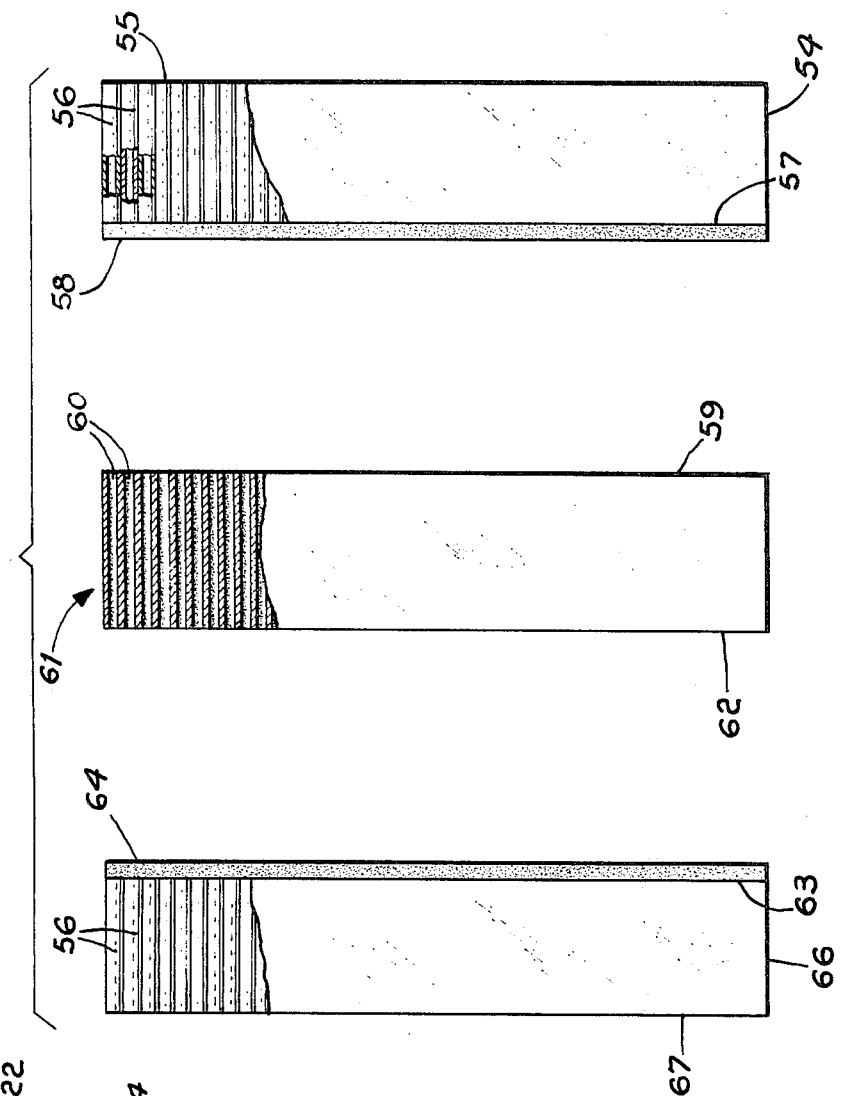
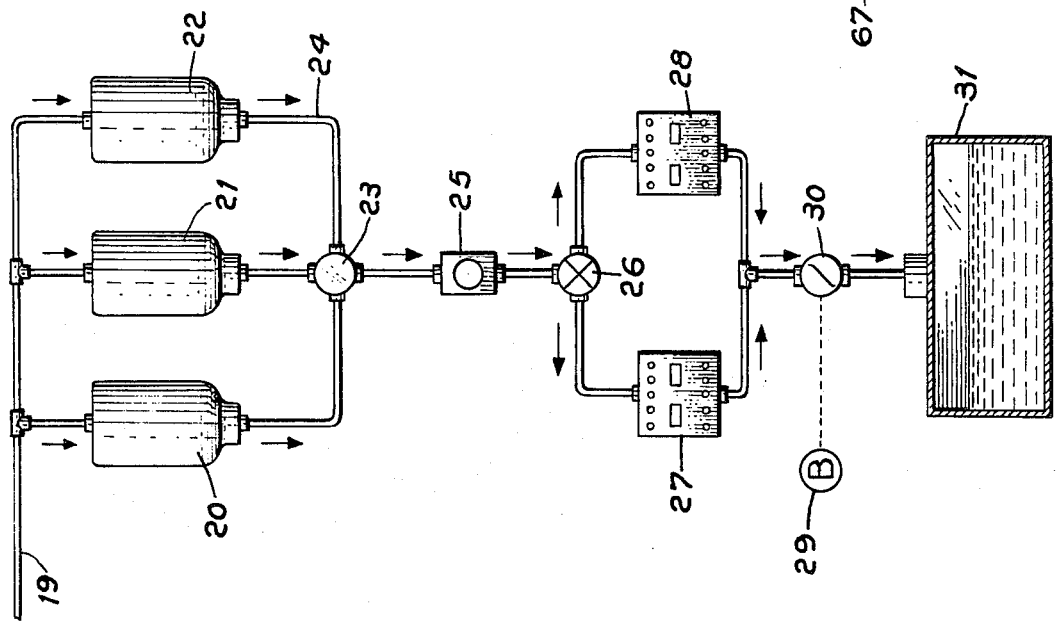

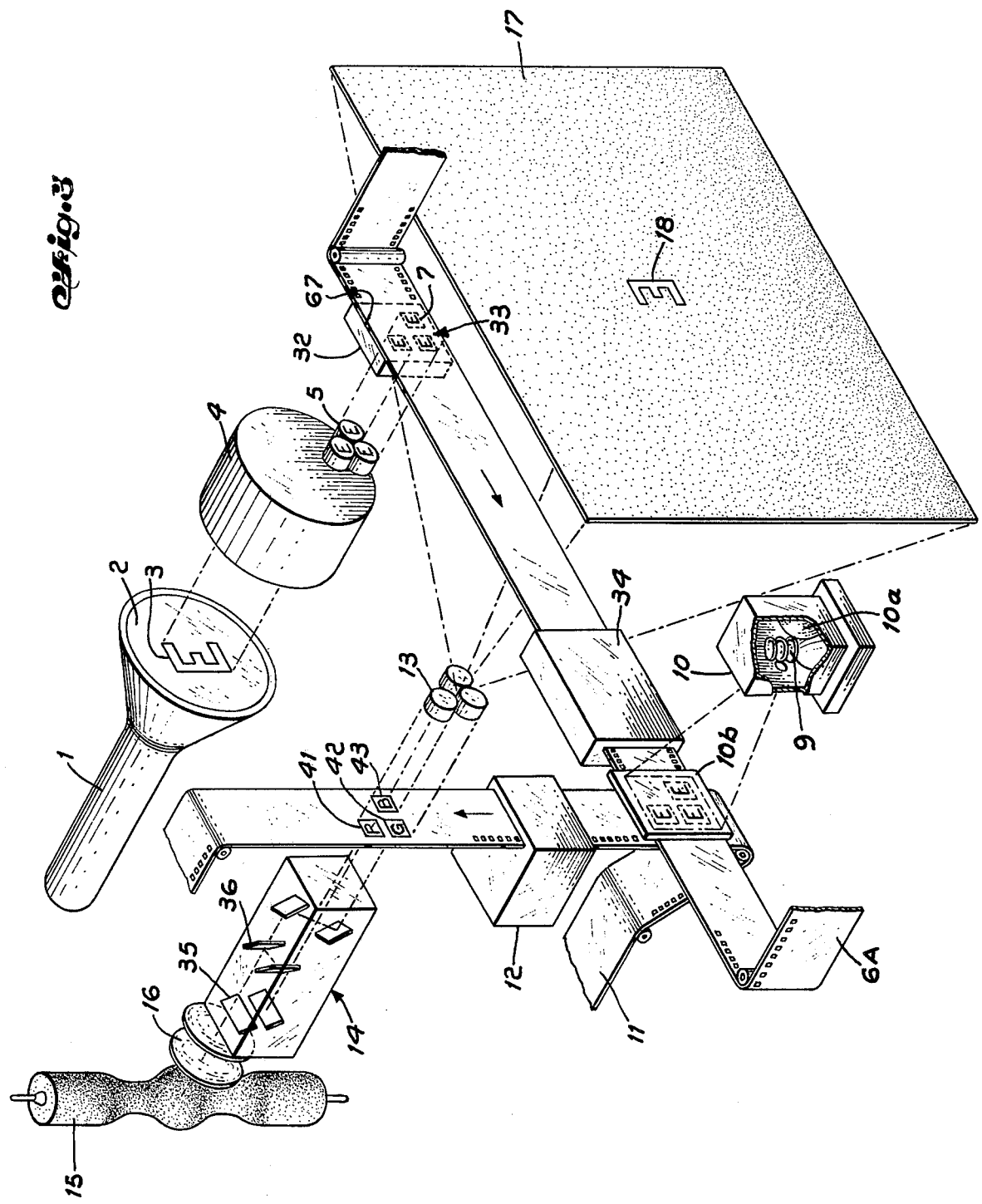

GROUP DISPLAY SYSTEM

BACKGROUND OF THE INVENTION

Large size full color projections of information data find important application to the fields of air traffic control for both commercial and military purposes. Information provided at the output of a cathode ray tube, which is used to radar scan a large information field, for example, can in turn be projected upon a large wall-sized screen for observation and surveillance by a group of controllers. When the cathode ray tube output data is color augmented and interfaced with a computer traffic control pattern it can be instantly analyzed for conformance to pre-arranged control patterns. If an unscheduled or otherwise unidentified aircraft should stray into the information pattern being displayed then the "unidentified" aircraft could be represented in a contrasting color (usually red) to other aircraft in the viewing field.

The use of group display generators for military purposes is particularly important in view of early warning and countermeasure applications. In miliary applications, for example, mobile ships and planes could constantly scan preassigned locations and project the information concerning flight activity within these locations to a selected group of personnel. Here unidentified aircraft portrayal in contrasting colors would alert military personnel as to effective countermeasures if any should become necessary.

Current methods for projecting full color displays from the output of cathode ray tube faceplates use wet chemistry film developing techniques in order to provide a permanent film record of the information received from the cathode ray tube faceplate. The data present on the cathode ray screen is projected simultaneously through three separate monochromatic lenses to three different color assignment areas onto a light sensitive black and white film. The film is usually transferred to a wet chemical solution for developing and printing and from there to an optical projection system consisting of projection lamps and colored filters for converting the monochromatic color assigned areas on the film to color and transmitting the film image in color upon a wall-sized viewing screen.

This method is very efficient for producing large size reproductions of the details appearing upon the face of the cathode ray tube and provides useful information in view of the good definition and contrast occurring in the projected image. However, in certain applications, a dry film process is necessitated since space requirements do not permit the facilities that are required by the large amount of apparatus and materials necessary for the wet chemical film developing process. In mobile applications upon ships, submarines and aircraft, where group display generators find particular application, dry film processes must be employed because of the serious space storage limitations involved.

The present state-of-the-art of dry film processes for the development of silver halide films are not very efficient in view of the limited image amplification by the dry film technique. Whereas wet chemical processes are capable of image amplification in the order of 1,000,000, the dry film development process is limited to the order of 1,000. It quite often occurs that the dry film limited sensitivity renders group display generator applications ineffective since the low level brightness available on the face of the cathode ray tube faceplate is incapable of transferring sufficient illumination to the surface of the film during exposure to provide meaningful data when the exposed film is later developed by the dry process at the inherently low image amplification available. The developed and printed film in most group display generator systems is placed between an array of projection lenses and a strong source of projected light. The energy supply for projected viewing therefor is independent of the film developing process and finds more than sufficient intensity in view of the high intensity projection lamps available. The ineffectiveness of dry film development applications therefore is due to both the inherently low level illumination provided upon the face of the cathode ray tube display screen and the low image amplification factor inherent in current dry film and dry film processing techniques.

The purpose of this invention, therefore, is to provide a novel arrangement for additive color projection by means of an image intensifier augmented cathode ray tube and dry film recording process, whereby adequate film surface illumination is provided by an image intensifier to overcome the inherent low image amplification factor of the dry silver halide film process.

SUMMARY OF THE INVENTION

This invention comprises an image intensifier augmented display tube in combination with a dry film recording process for additive color projection whereby the image on the faceplate of the display tube is simultaneously projected through a green assigned lens, a blue assigned lens and a red assigned lens upon the input faceplate of the image intensifier. The lenses here are not actually colored. The images they produce when later projected will be illuminated with the respective colored light. The image is then light intensified by a factor of 1,000 and directed to the surface of a dry developing type silver halide film for exposure. After exposure the film is transferred through a preheater into a heat developing unit for complete film processing. Developed film at this point is then contact-printed onto an ultraviolet sensitive film which is also developed by a thermal process. The printed film is then transferred into an optical projecting system consisting of the standard array of projection lamp, dichroic filters, and colored lenses for projection and subsequent viewing on a large wall-size screen.

An additional feature of the invention is that it is possible to supplement existing group display devices of the wet chemical type by substituting the image intensifier and dry film and developer unit directly for existing wet film and processing systems. The use of the image intensifier and dry film and process therefore obviates the need for the containers of liquid developing chemicals, along with the flow meters and pumps and drains that are associated with the wet developing process.

Although direct substitution for the wet developing films and processes would thereby enable existing group display devices to operate at a greatly reduced expenditure in time, materials and space, the data display system of this invention primarily lends itself to a completely new mobile and compact configuration independent from any of the existing wet chemical and other display devices now in operation.

BRIEF DESCRIPTION OF THE DRAWINGS

FIG. 1 is a schematic presentation of a group display generator using the wet film developing process of the prior art;

FIG. 2 shows the apparatus of the wet film processor of FIG. 1 in enlarged detail;

FIG. 3 shows a schematic representation of the group display generator of the instant invention;

FIG. 5 shows an exploded view of the structure of the image intensifier of FIG. 4 in partial section.

DESCRIPTION OF THE PREFERRED EMBODIMENT

Figure 4:
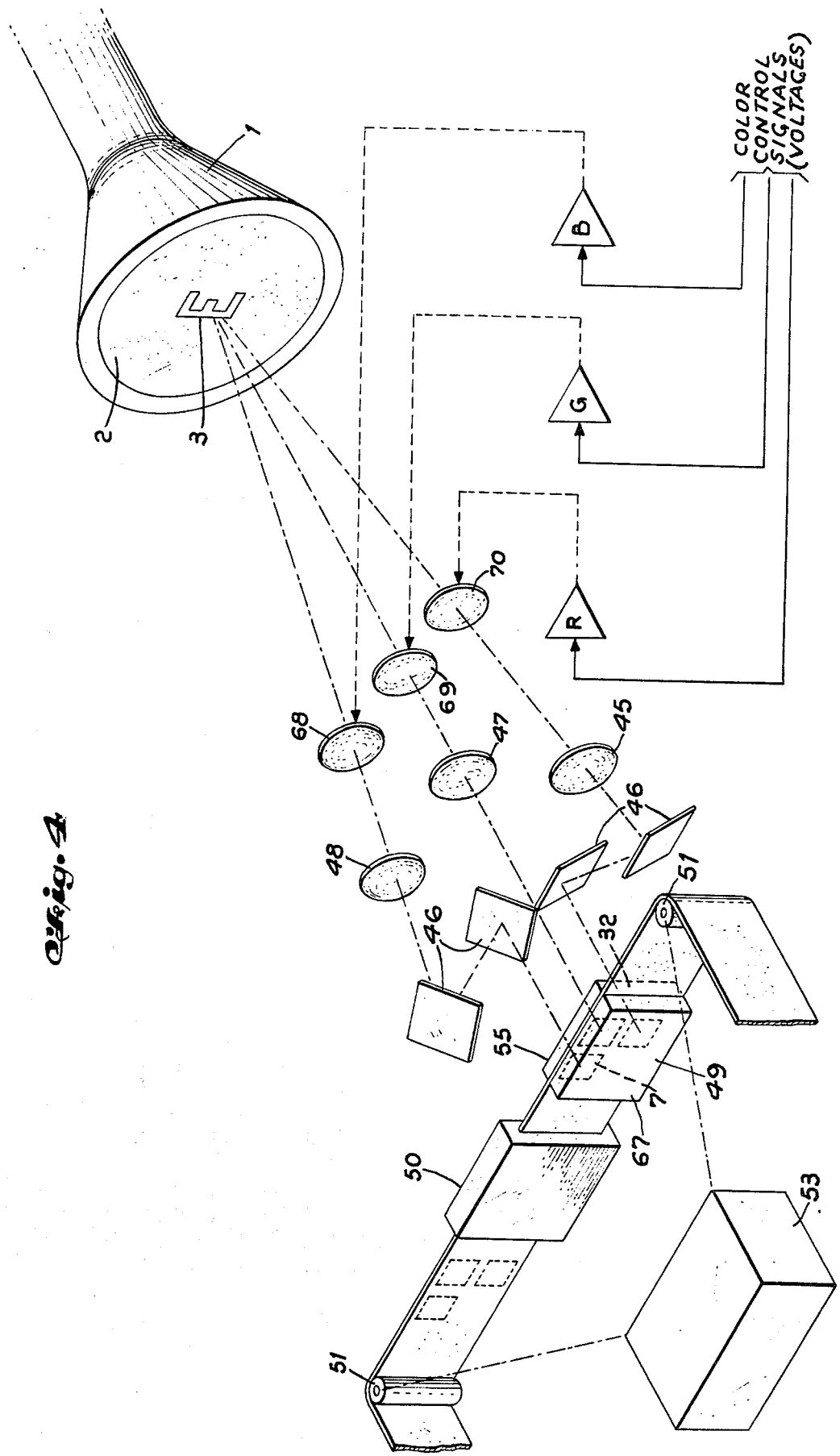
FIG. 4 shows a schematic representation of the image intensifier and optical apparatus for the system of FIG. 3 in greater detail.

FIG. 1 shows a group display generator using the wet chemical process for film development where input data to be displayed first appears as an image 3 on the screen 2 of a standard cathode ray tube 1 and through a system of input optics onto the surface of a silver halide film 6. The input optics 4 and 5 generally contains a system of three color selection shutters and three associated lenses for subsequent additive color projection. The film 6 is then transferred into a silver halide processor 8 shown here in block form the structure of which will be subsequently discussed in detail. From the silver halide processor 8 the image 7 on the film is then contact-printed by means of an ultraviolet lamp 9 on film 11 and subsequently processed through a separate film processing station 12. After processing the film 11 is now transferred through a projection optics system consisting mainly of a projection lamp 15 and condenser 16, and dichroic mirror module 14 for projecting by lenses 13 upon a large sized viewing screen 17.

FIG. 2 illustrates the silver halide processor 8 of FIG. 1 in greater detail. Here a series of reservoirs containing developing chemicals 20 along with clear 21 and rinse 22 solutions each of which is supplied with a source of heat 19 and is controllably valved through an automatic sequence valve 23 for calibrated dispensing. After selectively dispensing prescribed quantities of each solution to the film surface the excess solution is directed by a series of flow lines 24 to a vacuum pump 30 and into a drain container 31. A pair of first and second applicators 27, 28 are also shown along with a motor 29 which provides energy to the pump(s) 30. The wet chemical system because of the concentration of chemicals in liquid form is capable of very high image intensification to the exposed film. However, as can be seen by the complexity of materials and controls involved serious storage, shelf life and other materials handling problems are involved.

FIG. 3 shows a group display generator employing the dry silver process according to the instant invention. The system is somewhat similar to that of FIG. 1 except here the characteristics of the input optics 4 are described in greater detail. Intermediate the dry silver film 6A and the input optics 4 and 5 there is interposed an image intensifier 32. One example of a very effective image intensifier unit is that described within U.S. Pat. No. 3,737,667 issued to Babb et al. and assigned to the assignee of the instant invention. That portion relating to the image intensifier portion of the aforementioned patent is incorporated herein by reference in order to provide sufficient disclosure to the characteristics of the image intensifier unit. The projected image 7 reaching the input faceplate 55 of FIGS. 4 and 5 of the image intensifier 32 passes through the exit faceplate 67 which is in close contact with the dry silver film 6A where the image 7 appears in three color assigned film areas 33 red, green and blue. The exposed film 6A then proceeds into a dry silver heat processor 34 where the dry silver film 6A is processed before subsequent printing onto a kalvatone type film 11 which is ultraviolet responsive. The printed film 11 now becomes further processed in the kalvatone processor 12 which is also a heat sensitive process before proceeding through the projection optics 13 for readout upon the large size projection screen 17. The projection optical system as shown in FIG. 3 consists of a high power xenon projection lamp 15 and a sequence of blue 35, red 36 and green 36 dichroic mirror color separators. Here the tri-color components of the projected light pass through the color assigned areas of the film 11 and are in turn projected in full color upon the aforementioned display screen 17. The projection optics shown associated with the contact-printing station 10 comprise an ultraviolet light source 9 and utltraviolet reflector lens 10a and an ultraviolet transmissive reflecting glass 10b. This is required since the kalvatone film 11 is ultraviolet responsive, and developed by infrared energy.

FIG. 4 shows an enlarged schematic of the intermediate optics of the dry system along with the position of the image intensifier 32 relative to the film processing station 34 of FIG. 3. Here the image 3 present upon the screen 2 of the cathode ray tube 1 is projected separately and/or simultaneously through a red 45, green 47 and blue 48 color assigned lens depending on whether shutters 68, 69 and 70 are opened or closed. The image 7 from each lens 45, 47, 48 then becomes directed by a system of four mirrors 46 located at exact positions within the image optical plane in order to be directed to exact preassigned locations on the surface of the input faceplate 55 of the image intensifier unit 32. The use of an image intensifier 32 incurring a thickness of one-half inch and an input faceplate 55 width of 75 mm facilitates matching between the 70 mm film 6A. Here a vacuum and heat platen 49 serves to hold the film 6A in intimate contact with the image intensifier 32 and to preheat the film 6A prior to complete developing in hot air chamber 50. The use of a film drive and index system 53 sets the location and motion speed of the film 6A by the use of interconnected rollers 51 to insure proper exposure and development time. The shutters 68, 69 and 70 are selectively actuated by electrical voltages depending on the color programmed for the particular cathode ray tube image. The shutters 68, 69 and 70 can be controlled by a circuit consisting of diode logic and electromechanical devices not shown.

FIG. 5 shows a partial section of the components of the image intensifier 32 that contribute to the geometric optics of this invention. A first (input) faceplate 55 of the image intensifier 32 of unit of FIG. 5 consists of a number of coherently orientated optical fibers 56 each optical fiber receiving and transmitting a discrete portion of one of the color assigned images 7 which are transmitted to an exact location 33 on the surface of the faceplate as shown in FIG. 3. This exact correlation between the prelocated region 33 on the surface of input faceplate 55, the intensifier 32 and the resulting location upon a specific region on the surface of the film 6A is brought about by the excellent transmissive properties of the fiber optic faceplate 55. The one-toone correspondence between a point on the image plane preassigned to a particular region of the fiber optic faceplate 55 is carried through the fiber optic image system to the opposite side thereof in turn to a photo-emissive coating 58 existing on the exit surface 57 of the opposite side of the faceplate 55. A photoelectron in response to the light energy of the transmitted image 7 then transits through a microchannel plate 61 for electrical amplification. The microchannel plate 61 contains a voltage source (not shown) for accelerating and multiplying the photo-electrons released from the photoemissive coating 58. After electric amplification the photoelectrons then impinge upon a phosphor coated surface 64 where the electrical energy carried by photoelectrons and cascade electrons and multiplied by electron acceleration within the microchannel plate amplifier 61 is reconverted back to light by the electroluminescent response properties of the phosphor coating 64. The exit faceplate member 67 of the image intensifier 32 correspondingly comprises a second coherent fiber optic faceplate 66 one surface of which (the input faceplate 63), contains the aforementioned phosphor coating 64 and the exit surface of which the exit faceplate 67, comprises a highly polished coherent matrix of the same optical fibers 56 absent the phosphor coating for the transmission therethrough of the light intensified by means of the aforementioned amplification of the photo-optically emitted electrons. The now amplified light signal bearing the initial image predescribed to the aforementioned entrance of the first fiber optic faceplate 54 transmits therethrough the aforementioned second fiber optic faceplate 66 with very little loss in definition and increased in intensity by a factor of roughly 1,000. The intensified image then impinges directly upon the surface of the dry silver film 64 with sufficient light energy to expose the film for subsequent development in order to provide good image amplification and good contrast. The film 6A is then transmitted by means of a coordinated film drive and index system 53 through a hot air chamber 50 for thermal development of the film 6A as described above. The geometry of the image intensifier 32 unit readily allows for a good mechanical connection therebetween the film 6A and the image intensifier 32 by means of the aforementioned vacuum and heat platen 49 show in FIG. 4.

FIG. 3 shows in somewhat greater detail the optics of the projection system of FIG. 1 relative to the dry silver development process and the subsequent dry silver printing process. After developing the film 6A within the aforementioned hot air process chamber 50 the image 7 is then transmitted onto a continuously moving supply reel (not shown) containing the ultraviolet sensitive kalvatone film 11. Here an ultraviolet source 9 and directive reflector 10a transmits the developed image 7 through said dry silver film 6A onto the kalvatone film 11. In a continuous film conveying operation the kavlatone film 11 then proceeds through a heat processor system 12 and upon processing further passes through an array of transmitted blue 43, green 42 and red 41 chromatic light rays by the aforementioned placement of dichroic mirror filters 35 and 36 as shown in FIG. 3.

The projection optics for the purpose of this embodiment comprise a series of three projection lenses 13 each corresponding to an optical path predescribed for each of the tri-chromatic light beams 41, 42, 43. Here the printed image 18 becomes simultaneously projected in each of the blue, green and red color components in an integrated and enlarged color display 18 upon the large size viewing screen 17.

A group display generator having the fiber optic image intensifier 32 and a complementary dry film processing system 34 has been demonstrated by way of embodiment for group display generators in particular for air traffic control and defense countermeasures. The system finds application in other areas not specifically relating to air traffic control applications but, for example, sports events and other commercial applications where a large visual field is scanned and the information are recorded upon film for storage and projection purposes.

While I have described above the principles of my invention in connection with specific apparatus it is to be clearly understood that this description is made only by way of example and not as a limitation to the scope of my invention as set forth in the objects thereof and in the accompanying claims.

What is claimed is:

1. A projecting system for group data display comprising:
   a luminous data source
   means for intensifying the light energy of said data disposed optically proximate said source;
   means for recording said data disposed optically proximate said means for intensifying; and
   means for projecting said data upon a viewing screen, said means for projecting and said viewing screen being disposed optically proximate said means for recording;
   said means for recording said data comprising:
      a first light sensitive film proximate said means for intensifying for receiving said light energy from said means for intensifying and exposing said film;
      first dry chemical means for processing said first film in order to develop said data on said film;
      optical means for transferring the data from said first film onto a second light sensitive film; and
      second dry chemical means for processing said second film in order to print said data on said second film;
   said means for projecting said data and said viewing screen being optically proximate said second film after said data has been printed thereon.

2. The system of claim 1 wherein said means for intensifying the light energy of said data comprises:
   an image intensifier having a first faceplate for receiving said light energy;
   photoemissive means for converting said light energy to electrical energy;
   electron multiplying means for amplifying said electrical energy;
   luminescent means for converting said electrical energy to light energy; and
   a second faceplate for transmitting said light energy to said means for recording said data.

3. The system of claim 2 wherein said means for amplifying said electrical energy comprises a microchannel plate electron multiplier.

4. The system of claim 1 wherein said means for projecting said data comprises a projection lamp and at least one optical condenser.

5. The system of claim 4 wherein said means for projecting said data further includes a plurality of chromatic dichroic filters intermediate said projection lamp and said viewing screen for transmitting said data upon said screen in color.

6. The system of claim 1 wherein said luminous data source comprises the faceplate of a cathode ray tube.

7. The system of claim 1 wherein said first light sensitive film comprises a dry process silver halide film.

8. The system of claim 1 wherein said second film comprises an ultraviolet sensitive film.

9. The system of claim 1 wherein said first dry chemical means for processing said first light sensitive film and said second dry chemical means for processing said second film comprise thermal film developing processes.

10. The system of claim 1 further including means for selectively transmitting said luminuous data to color assigned areas of said means for intensifying the light energy of said data.

11. The system of claim 10 wherein said means for transmitting said color assigned data comprises a plurality of chromatic lenses intermediate said luminous source and said means for intensifying the light energy of said data.

12. A group data display generator for projecting luminous data from the faceplate of a display tube upon a viewing screen in color comprising in combination:

a plurality of green, red and blue color assigned transmitting lenses in the optical path of said data for transmitting said data simultaneously through said lenses;

an image intensifier optically proximate said lenses for receiving said luminous data and amplifying the light intensity of said data;

a dry type silver halide film optically proximate said image intensifier for receiving said luminous data and exposing said film;

a first thermal processor coupled to said silver halide film for heat developing said silver halide film;

an ultraviolet film and ultraviolet light source in optical proximity with said silver halide film for transposing said data through said silver halide film onto said ultraviolet sensitive film by means of said ultraviolet light;

a second thermal processor coupled to said ultraviolet sensitive film for heat developing said ultraviolet sensitive film;

a projection lamp and viewing screen optically proximate said ultraviolet sensitive film; and a plurality of chromatic dichroic filters intermediate said projection lamp and viewing screen for transmitting through said ultraviolet sensitive film light corresponding to said chromatic filters for projecting said data from said ultraviolet sensitive film upon said screen in color.

* * * * *